United States Patent
Gupta et al.

[19]

[11] Patent Number: 6,108,745
[45] Date of Patent: Aug. 22, 2000

[54] FAST AND COMPACT ADDRESS BIT ROUTING SCHEME THAT SUPPORTS VARIOUS DRAM BANK SIZES AND MULTIPLE INTERLEAVING SCHEMES

[75] Inventors: Anurag Gupta, Santa Clara, Calif.; Scott Pitkethly, Fort Collins, Colo.

[73] Assignee: Hewlett-Packard Company, Palo Alto, Calif.

[21] Appl. No.: 08/962,490

[22] Filed: Oct. 31, 1997

[51] Int. Cl.$^7$ ..................................................... G06F 12/08
[52] U.S. Cl. ................... 711/3; 711/5; 711/217; 711/157; 711/127; 711/128
[58] Field of Search ................... 711/105, 129, 711/5, 202, 134, 217, 154, 157, 127, 128, 3

[56] References Cited

U.S. PATENT DOCUMENTS

| | | | |
|---|---|---|---|
| 5,390,308 | 2/1995 | Ware et al. | 711/5 |
| 5,696,917 | 12/1997 | Mills et al. | 710/35 |
| 5,745,913 | 4/1998 | Pattin et al. | 711/105 |
| 5,761,695 | 6/1998 | Maeda et al. | 711/5 |
| 5,890,221 | 3/1999 | Liu et al. | 711/210 |

*Primary Examiner*—John W. Cabeca
*Assistant Examiner*—Matthew D. Anderson
*Attorney, Agent, or Firm*—David A. Plettner

[57] ABSTRACT

An address routing scheme supports a variety of memory sizes and interleaving schemes. In one embodiment, any address bit provided by the processor can be routed to any bank, row, or column bit, and can be used to generate any rank bit. This embodiment supports any type of interleaving scheme and memory modules constructed from a wide variety of DRAM chips. In another embodiment, a reduced routing function is used to generate rank bits and route address bits to subsets of bank, row, or column bits such that no route function encoding requires more than 3 bits. The second embodiment supports multi-cache line interleaving, cache effect interleaving, and DRAM page interleaving. Multi-cache line causes cache lines contained in small contiguous blocks to be contained in one DRAM page, while contiguous small contiguous blocks are stored on separate DRAM pages. Cache-effect interleaving greatly increases the probability that cache lines having the same index, but different tags, will be stored in different banks by routing one or more of the address bits corresponding with the bits immediately above the cache memory index field to either bank or rank bits. Finally, DRAM page interleaving causes contiguous (or proximate) DRAM pages to be stored in separate banks by routing one or more of the address bits corresponding with the bits immediately above the column boundary to either bank or rank bits.

27 Claims, 13 Drawing Sheets

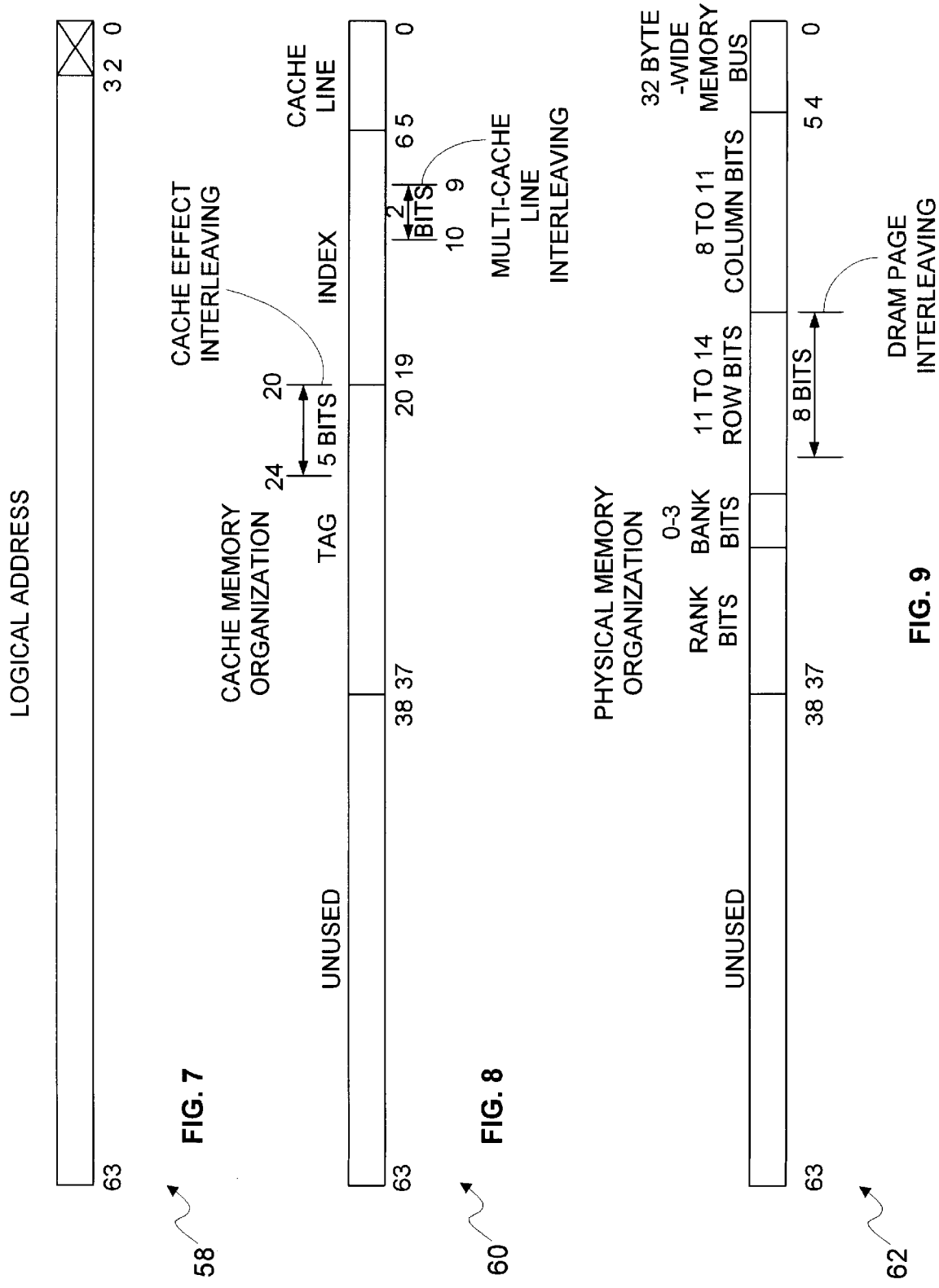

ADDRESS BIT ROUTINGS

| ADDR. BIT | RANK SELECT | | COLUMN BITS | | | | | | | | | | | ROW BITS | | | | | | | | | | | | | BANK BITS | | | ROUTING FUNCTION VALUES |
|---|---|---|---|---|---|---|---|---|---|---|---|---|---|---|---|---|---|---|---|---|---|---|---|---|---|---|---|---|---|---|
| | 0 | 1 | 0 | 1 | 2 | 3 | 4 | 5 | 6 | 7 | 8 | 9 | 10 | 0 | 1 | 2 | 3 | 4 | 5 | 6 | 7 | 8 | 9 | 10 | 11 | 12 | 13 | 0 | 1 | 2 | |
| 0 | | | | | | | | | | | | | | | | | | | | | | | | | | | | | | | NOT PROVIDED BY CPU |
| 1 | | | | | | | | | | | | | | | | | | | | | | | | | | | | | | | NOT PROVIDED BY CPU |
| 2 | | | | | | | | | | | | | | | | | | | | | | | | | | | | | | | NOT PROVIDED BY CPU |
| 3 | | | | | | | | | | | | | | | | | | | | | | | | | | | | | | | WORD ORDER |
| 4 | | | | | | | | | | | | | | | | | | | | | | | | | | | | | | | WORD ORDER |

| ADDR. BIT | RANK SELECT | | COLUMN BITS | | | | | | | | | | | ROW BITS | | | | | | | | | | | | | BANK BITS | | | ROUTING FUNCTION VALUES |
|---|---|---|---|---|---|---|---|---|---|---|---|---|---|---|---|---|---|---|---|---|---|---|---|---|---|---|---|---|---|---|
| | 0 | 1 | 0 | 1 | 2 | 3 | 4 | 5 | 6 | 7 | 8 | 9 | 10 | 0 | 1 | 2 | 3 | 4 | 5 | 6 | 7 | 8 | 9 | 10 | 11 | 12 | 13 | 0 | 1 | 2 | |
| 5 | | | ■ | | | | | | | | | | | | | | | | | | | | | | | | | | | | 1 |
| 6 | | | | ■ | | | | | | | | | | | | | | | | | | | | | | | | | | | | 1 |
| 7 | | | | | ■ | | | | | | | | | | | | | | | | | | | | | | | | | | 1 |
| 8 | | | | | | ■ | | | | | | | | | | | | | | | | | | | | | | | | | 1 |
| 9 | ■ | ■ | | | | | ▨ | ▨ | | | | | | | | | | | | | | | | | | | ■ | ■ | | 6 |
| 10 | | | | | | | | ▨ | | | | | | | | | | | | | | | | | | | | | ■ | | 5* |

*MULTIPLE COLUMN ROUTINGS REQUIRE ONLY 1 ROUTING VALUE DUE TO MULTIPLEXER FUNCTION

| ADDR. BIT | RANK SELECT | | COLUMN BITS | | | | | | | | | | | ROW BITS | | | | | | | | | | | | | BANK BITS | | | ROUTING FUNCTION VALUES |
|---|---|---|---|---|---|---|---|---|---|---|---|---|---|---|---|---|---|---|---|---|---|---|---|---|---|---|---|---|---|---|
| | 0 | 1 | 0 | 1 | 2 | 3 | 4 | 5 | 6 | 7 | 8 | 9 | 10 | 0 | 1 | 2 | 3 | 4 | 5 | 6 | 7 | 8 | 9 | 10 | 11 | 12 | 13 | 0 | 1 | 2 | |
| 29 | ■ | | | | | | | | | | | | | ■ | | | | | | | | | | ■ | | | | | | | 6 |
| 30 | ■ | | | | | | | | | | | | | | ■ | | | | | | | | | | ■ | | | | | | 6 |
| 31 | ■ | | | | | | | | | | | | | ■ | | ■ | | | | | | | | | | ■ | | | | | 6 |
| 32 | ■ | | | | | | | | | | | | | | ■ | | ■ | | | | | | | | | | ■ | | | | 5 |
| 33 | ■ | | | | | | | | | | | | | ■ | | ■ | | ■ | | | | | | | | | ■ | | | | 6 |
| 34 | ■ | | | | | | | | | | | | | | | | ■ | | ■ | | | | | | | | | | | | 5 |
| 35 | ■ | | | | | | | | | | | | | | | | | ■ | | ■ | | | | | | | | | | | 5 |
| 36 | ■ | | | | | | | | | | | | | | | | | | ■ | | ■ | | | | | | | | | | 5 |
| 37 | ■ | | | | | | | | | | | | | | | | | | | ■ | | ■ | | | | | | | | | 5 |

FAST AND COMPACT ADDRESS BIT ROUTING SCHEME THAT SUPPORTS VARIOUS DRAM BANK SIZES AND MULTIPLE INTERLEAVING SCHEMES

CROSS REFERENCE TO RELATED APPLICATION

The present application contains subject matter related to a co-pending U.S. patent application entitled "A Main Memory Bank Indexing Scheme That Optimizes Consecutive Page Hits by Linking Main Memory Bank Address Organization to Cache Memory Address Organization" by Tomas G. Rokicki. This application was filed on even date with the present application, is assigned to the same assignee as the present application, is identified by Ser. No. 08/963,673, pending, and is hereby incorporated by reference.

FIELD OF THE INVENTION

The present invention relates to computer memory systems. More specifically, the present invention relates to routing address signals to memory banks in a computer system.

DESCRIPTION OF THE RELATED ART

In the art of computing, it is common to store program instructions and data in dynamic random access memory (DRAM). The most common type of DRAM memory cell is a single transistor coupled to a small capacitor. A data bit is represented in the memory cell by the presence or absence of charge on the capacitor. The cells are organized into an array of rows and columns.

FIG. 1 is a block diagram of a typical prior art memory chip 10 that is based on a 4 megabit memory array 12 having 2,048 rows and 2,048 columns. Memory chip 10 has a 4 bit wide data input/output path. Row demultiplexer 15 receives an 11 bit row address and generates row select signals that are provided to memory array 12. Page buffer 14 acts as a temporary storage buffer for rows of data from array 12. Column multiplexer 16 receives a 9 bit column address and multiplexes the 4 bit data input/output path to a selected portion of buffer 14.

The distinction between rows and columns is significant because of the way a memory access proceeds. Page buffer 14 is formed from a single row of cells. The cells act as a temporary staging area for both reads and writes. A typical DRAM access consists of a row access cycle, one or more column accesses cycles, and a precharge cycle. The precharge cycle will be described in greater detail below.

The row access cycle (also called a page opening) is performed by presenting the row address bits to row demultiplexer 15 to select a row. The entire contents of that row are then transferred into page buffer 14. This transfer is done in parallel, and it empties all memory cells in that row of their contents. The transfer is done by driving whatever charge exists in each row capacitor down to a set of amplifiers that load page buffer 14. This operation also erases the contents of the capacitors of the row that is accessed. For typical prior art DRAMs, this operation takes approximately 30 ns.

Next, the column access cycle is performed by presenting the column address bits to select a particular column or set of columns, and the data is either read from or written to page buffer 14. During the column access cycle, page buffer 14 acts as a small RAM. The typical access delay for this operation is approximately 30 ns to receive the first 4 bits of data, and 10 ns to receive subsequent 4 bit chunks of data. Several consecutive accesses can be made to the page to access different columns, thereby allowing the entire row to be written to or read from very quickly. For a typical four bit wide DRAM such as that shown in FIG. 1, a page of 2,048 bits (or 256 bytes) can be read out in 512 accesses, or 5.14 $\mu$s. Accordingly, the bandwidth of DRAM chip 10 is 49.8 megabytes per second. It is easy to see how a few DRAM chips in parallel can yield very high bandwidth.

The final cycle of the memory access is the precharge cycle, which is also known in the art as page closing. As discussed above, the row access cycle destroyed the contents of the capacitors of the row that was read into buffer 14. Before another row can be read into buffer 14, the contents in page buffer 14 must be transferred back to memory array 12. This process is called the precharge cycle. In most prior art DRAM chips, no address is required because the address of the open row is latched when the contents of that row are transferred into buffer 14, and that address is retained as long as the page is open. Typically, the precharge cycle lasts about 40 ns.

In addition to the normal read and write access cycles, most DRAMs also require refresh cycles. The small capacitors that make up each memory cell suffer from leakage, and after a short period of time, the charge will drain away. To prevent the loss of data, each row must be precharged (opened and closed) at a certain minimum rate. The size of the capacitors and leakage allowed is balanced with the size of the array in such a way that the number of refresh cycles required is a small fraction of the total bandwidth of the DRAM. Typically, DRAMs are engineered such that refreshing the rows at a rate of one row per 60 microseconds is sufficient to maintain the data. Accordingly, while data can be written to and read from page buffer 14 many consecutive times, buffer 14 cannot be held open indefinitely because it must be periodically closed to allow other rows to be refreshed.

There are two primary types of DRAMs known in the art, asynchronous DRAMs and synchronous DRAMs. Asynchronous DRAMs do not have a clock input. Rather, complex timing constraints among various signals and addresses must be satisfied in order for the DRAM to operate properly. The two main control pins for asynchronous DRAMs are "row address strobe" (RAS) and "column address strobe" (CAS). To open a row, RAS is asserted (typically, lowered). To close a row, RAS is deasserted. To access a column CAS is asserted, and to access another column, CAS must be deasserted and then reasserted. Note that CAS can be asserted and deasserted multiple times while RAS is asserted.

In contrast to asynchronous DRAMs, synchronous DRAMs (SDRAMs) accept a clock input, and almost all timing delays are specified with respect to this clock. In addition, SDRAMs usually have between two and eight different logical arrays of memory (or banks) that can operate independently. Rather than use separate RAS and CAS signals for each bank, a sequence of commands is sent to the DRAM synchronously to perform page opening, column access, and page closing functions. Additional address bits are used for bank selection. One major benefit provided by SDRAMs is pipelining. While one bank is being accessed, another bank can be refreshed or precharged in the background.

Despite these differences, SDRAM organization is very similar to asynchronous DRAM organization. In fact, many memory controllers for asynchronous DRAMs support multiple banks and background refreshing and precharging operations.

In the prior art, the term "bank" was traditionally used to denote a group of asynchronous DRAM chips that where accessed in parallel. Accordingly, a bank was accessed by generating a bank select signal, along with appropriate row and column addresses, as described above. However, a single SDRAM chip has multiple banks. Therefore, the term "rank" is used to denote a group of SDRAM chips that are accessed in parallel, and additional bank bits are routed to the SDRAM rank. In a system capable of supporting either SDRAMs or asynchronous DRAMs, typically the higher order bank bits that are used when accessing asynchronous DRAMs are used as rank bits when accessing SDRAMs, and the lower order bank bits that are used when accessing asynchronous DRAMs are routed to the SDRAMs. It should be noted that each bank within an SDRAM rank has its own set of page buffers.

DRAM chips can be organized to form main memory systems in a variety of ways. Typically the width and speed of the system bus are synchronized to the width and speed of the main memory system bus by providing the main memory system bus with the same bandwidth as the system bus. Usually system busses are both faster and wider than the data I/O interface provided by individual DRAM chips, so multiple DRAM chips are arranged in parallel to match the bandwidth of the system bus. If a particular computer system has a 16 byte wide data bus that operates at 66 MHZ, then a main memory subsystem of the computer system that operates at 33 MHZ and is constructed with 4-bit wide DRAM chips will typically have 64 DRAM chips arranged in each bank, thereby providing each bank with a bandwidth of nearly a gigabyte per second, which matches the bandwidth of the system data bus. If the bandwidths are not matched, other techniques may be employed, such as using a small FIFO to buffer memory accesses and blocking memory accesses when the FIFO is full.

Consider the page buffers of the DRAM chips that form a single bank. All the individual page buffers are accessed in parallel, thereby combining to form a larger "logical" page buffer. As shown in FIG. 1, each DRAM chip 10 has a 2,048 bit, or 256 byte, page buffer 14. If 32 chips are arranged in parallel, the logical page buffer is 8,192 bytes wide. If the low order address bits are used to index columns, two memory locations having addresses that differ only in the lower 13 bits of the logical memory address will be in the same row, and therefore will be available in a logical page buffer concurrently.

Each bank of DRAM chips has its own set of page buffers. Therefore, a logical page buffer exists for each memory bank provided in the computer system. If the high order address bits are used to select banks, then there is an 8 kilobyte logical page buffer for the first 16 megabytes of physical memory, another 8 kilobyte logical page buffer for the next 16 megabytes of physical memory, and so on.

If the system described above employed SDRAMs having bank select bits, the internal banks ofthe SDRAMs may be viewed as collections of relatively independent banks of DRAMs, with the high order bank bits used as rank select bits and the low order bank bits routed to the SDRAMs. Accordingly, for the purpose of illustrating the present invention below, there is little difference between the memory banks that are derived from collections of chips addressed independently, and the memory banks within SDRAM chips, except that in the latter case some of the bank bits are routed to the SDRAM chips.

Consider a typical cache line read in the system described above. First, the appropriate bank is selected, and then a row is transferred into the logical page buffers. This takes approximately 30 ns. Next, 4 16-byte chunks are read from the logical page buffer; this takes approximately 60 ns (30 ns for the first 16 byte chunk, and 10 ns for each of the next three 16 byte chunks), and provides a complete cache line. Finally, the logical page buffer is closed; this takes 40 ns. The total time was 130 ns. The time before the first word was read was 60 ns (page open plus first column access). Many system are configured such that the first word available is the first word required by the CPU. The time required to retrieve the first word is known in the art as the "critical word latency".

It is common in the art for a memory controller to gamble that successive references to the same memory bank will access the same row (or page). Such a memory controller is known as a page mode memory controller. A page hit occurs when the memory controller processes a memory access request, and finds that the row that needs to be accessed is already in the logical page buffer. In a page mode memory controller, the page is not closed after an access. Instead, the page is only closed when an access to that bank requires a different page or a refresh cycle occurs.

If a subsequent memory access is indeed for the same page, then the critical word latency is shortened from 60 ns to just 10 ns, a significant savings. If a subsequent memory access is not for the same page, then a penalty is incurred. The old page stored in the logical page buffer must undergo a precharge cycle before a new page can be opened, so the critical word latency is 40 ns (precharge) plus 30 ns (row access) plus 30 ns (first word available), or 100 ns, quite a bit more than the previous value of 60 ns that is achieved when the logical page buffer is precharged after every access.

If p is the probability that the next access is on the same page, then the average critical word latency is 30 ns*p+100 ns*(1–p), (or 100 ns–70 ns*p). Note that the critical word latency decreases asp increases. The point at which the gamble pays off is when the average critical word latency is 60 ns, which, as described above, is the critical word latency achieved when the logical page buffer is closed after each memory access. Accordingly, the point at which it pays to keep the logical page buffer open after each access occurs when there is a greater than 0.571 probability that a sequential memory access will reference the same page.

Assume that in a computer system having a page mode memory controller, requests are fed to the memory controller as fast as they can be consumed. Each time a page in a bank is accessed for the first time requires a precharge cycle to close the old page and a row access page to open the new page, which together require 70 ns. As described above, each cache line access from an open page requires 60 ns. Thus, an average cache line access requires 60 ns+70 ns (1–p). In contrast, as discussed above, a non-page mode memory controller requires 90 ns.

In the prior art, many page mode memory controllers simply mapped column bits to the least significant bits of the address, mapped row bits to the address bits immediately after the column bits, and then mapped bank select bits to the highest bits of the address. Given this configuration, assume that a large contiguous memory block that spans page boundaries must be accessed. As long as memory is being accessed from a single page buffer, no precharge cycles are required. However, when the end of the page is reached and the next page is required, a precharge cycle is required to store the old page and a row access cycle is required to access the new page. Since the row bits are arranged as described above, the next row required will be in the same bank as the previous row (unless the memory block spans a bank boundary).

U.S. Pat. No. 5,051,889 to Fung et al. and entitled "Page Interleaved Memory Access" provides an improvement when accessing contiguous memory that spans page boundaries. Basically, Fung et al. swap the first bank select bit with the first row select bit, thereby causing even memory pages to be stored in a first bank, and odd memory pages to be stored in a second bank. Accordingly, when a series of sequential memory accesses to a contiguous segment of memory cross a page boundary, the memory accesses also cross a bank boundary, which allows the precharge cycle of the first bank to be overlapped with the row access cycle of the second bank. The system disclosed by Fung et al. also allows two contiguous pages to be open at once, thereby allowing a program with an active "hot spot" that spans two contiguous pages to achieve a higher page hit rate.

A similar technique was proposed by Mike Bell and Tom Holman in a paper entitled "Pentium® Pro Workstation/Server PCI Chipset", which was published in the Digest of Papers of the 41$^{st}$ IEEE Computer Society International Conference held Feb. 25–28, 1996. The technique proposed by Bell and Holman is called address bit permuting, and like the memory scheme disclosed by Fung et al., involves swapping a bank bits and row bits.

While it is desirable to increase page hit rates, in a multi-processor system, it is also desirable to distribute memory accesses among different banks. One of the easiest ways to do this is to ensure that each processor distributes its accesses across different banks. One method known in the art that provided this feature is referred to as "cache line interleaving". Basically, cache line interleaving routes one or more bank bits to the address bits immediately above a cache line. Therefore, one cache line is stored in a first bank, the next cache line is stored in a second bank, and so one. In non-page mode controllers, this allows row access cycles and precharge cycles to be overlapped as contiguous cache lines are accessed. It also ensures that each processor's memory accesses are evenly distributed across memory banks, and thereby ensures that multiple processors will not be continuously contending for the same bank. Of course, cache line interleaving seeks to distribute multiple accesses across many banks, while a page mode controller seeks to route multiple accesses to the same bank, so these techniques are in conflict.

In a typical computer system memory is usually provided by single in-line memory modules (SIMMs) and/or dual in-line memory modules (DIMMs). The DIMMs and SIMMs are typically constructed using asynchronous DRAM chips or SDRAM chips. Usually a computer system will have a series of SIMM and/or DIMM sockets that accept the memory modules. Since SIMMs and DIMMs come in a variety of configurations, are constructed from different types of chips, and all sockets need not be populated, a memory controller of the computer system must have the ability to route address bits to various rank, bank, row, and column bits. Providing page interleaving greatly complicates this routing.

SUMMARY OF THE INVENTION

The present invention provides an address routing scheme capable of supporting a variety of memory sizes and interleaving schemes. A computer system in accordance with the present invention includes a processor that provides a series of address bits, a main memory unit that is accessed by bank bits, row bits, column bits, and possibly rank bits, and a memory controller that generates the bank bits, row bits, column bits, and rank bits from the address bits. In one embodiment, any address bit provided by the processor can be routed to any bank, row, or column bit, and can be used to generate any rank bit. This embodiment supports any type of interleaving scheme and supports memory modules constructed from a wide variety of DRAM chips.

In another embodiment, a reduced routing function is used to generate rank bits and route address bits to subsets of bank, row, or column bits such that no route function encoding requires more than 3 bits. The second embodiment supports multi-cache line interleaving, cache effect interleaving, and DRAM page interleaving.

Multi-cache line interleaving comprises part of the present invention and causes cache lines contained in small contiguous blocks to be contained in one DRAM page, while contiguous small contiguous blocks are stored on separate DRAM pages. Cache-effect interleaving greatly increases the probability that cache lines having the same index, but different tags, will be stored in different banks. Cache effect interleaving is achieved by routing one or more of the address bits corresponding to the bits immediately above the cache memory index field to either bank or rank bits. Finally, DRAM page interleaving (also known as contiguous page interleaving) causes contiguous (or proximate) DRAM pages to be stored in separate banks. DRAM page interleaving is achieved by routing one or more of the address bits corresponding with the bits immediately above the column boundary to either bank or rank bits The second embodiment of the present invention also supports a wide range of DRAM configurations. Memory modules constructed from DRAM chips as small as two megabits and SDRAMs as large as 1 gigabit are supported.

BRIEF DESCRIPTION OF THE DRAWINGS

FIG. 7 shows a logical address map of a computer system having a 64 bit wide address.

FIG. 8 shows the organization of a cache memory in a computer system.

FIG. 9 shows the organization of physical memory in a computer system.

FIGS. 10A–10C show address bit routings having compacted routing functions, in accordance with the present invention.

DETAILED DESCRIPTION OF THE PREFERRED EMBODIMENTS

Figure 1:
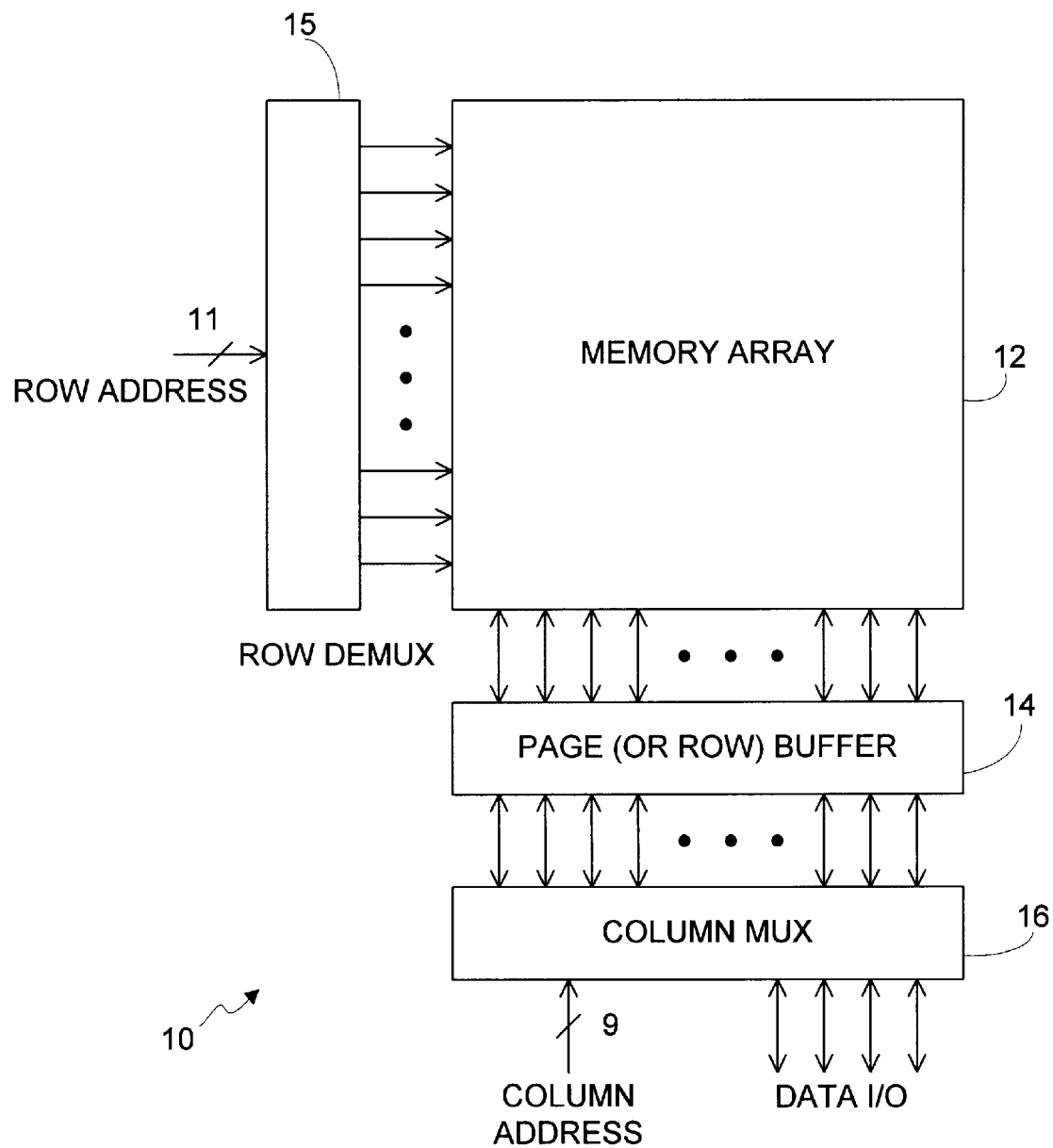
FIG. 1 is a block diagram of a typical prior art memory chip that is based on a 4 megabit memory array having 2,048 rows and 2,048 columns.
Figure 2:
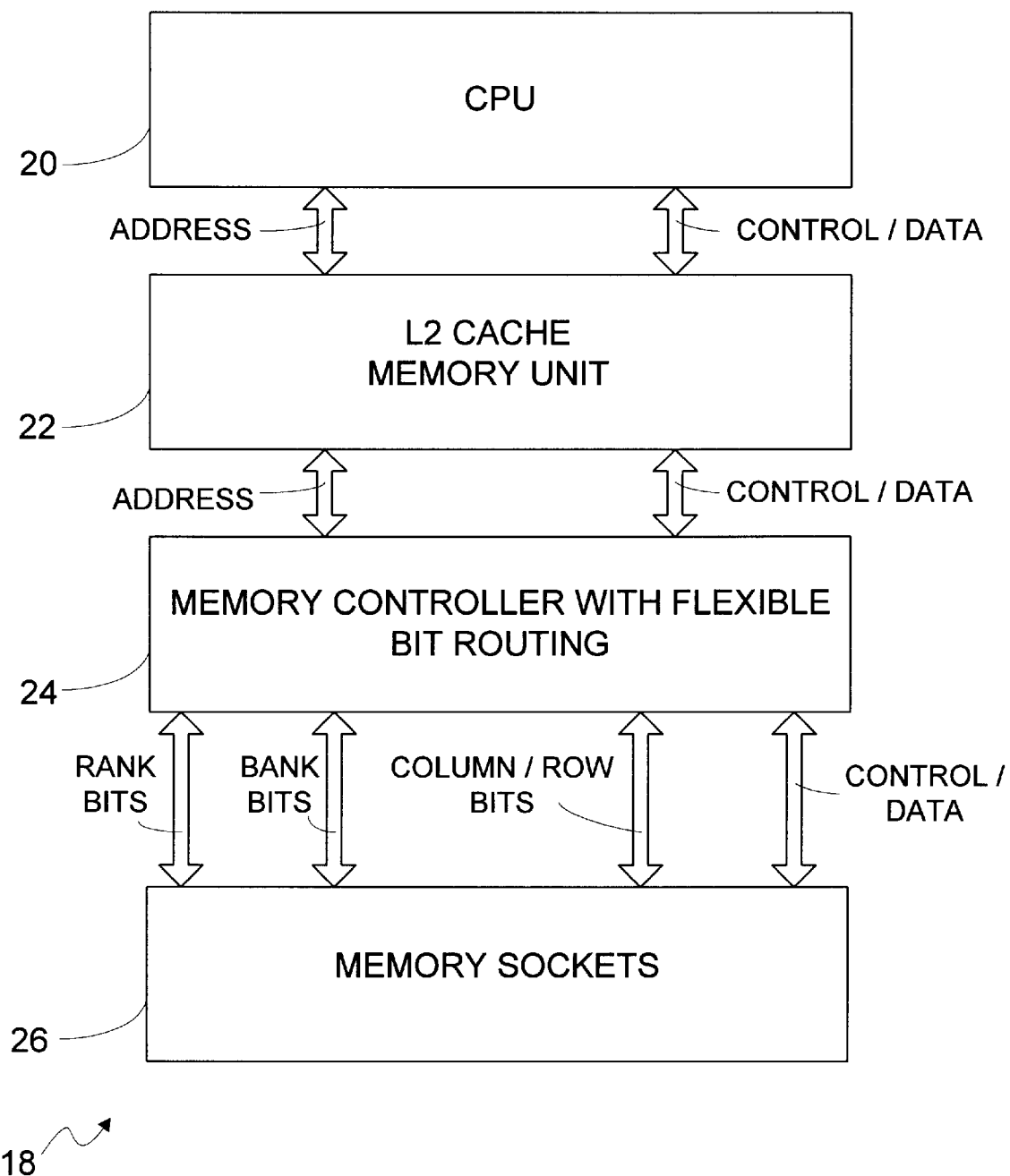
FIG. 2 shows a computer system that has a bit routing scheme in accordance with the present invention.

The present invention provides an address bit routing scheme that provides great flexible in routing address bits to rank, bank, row, and column bits. FIG. 2 shows a computer system 18 that implements the bit routing scheme of the present invention. Computer system 18 includes a central processing unit (CPU) 20 (which includes a level 1 (L1) cache), a level 2 (L2) cache unit 22, a memory controller 24 with flexible bit routing in accordance with the present invention, and a series of memory sockets 26.

CPU 20 is coupled to L2 cache memory unit 22 via a series of address, data, and control signals. Since data and control signals are not critical to an understanding of the present invention, they are shown collectively. L2 cache memory unit 22 is also coupled to memory controller 24 via a series of address, data, and control signals.

Memory controller 24 receives the address signals, and processes the address signals to form rank, bank, row and column bits. In addition, controller 24 creates and routes to memory sockets 26 any other control signals required, such as RAS and CAS signals, clock signals, read/write signals, etc. Controller 24 also routes data signals to memory sockets 26.

Figure 3:
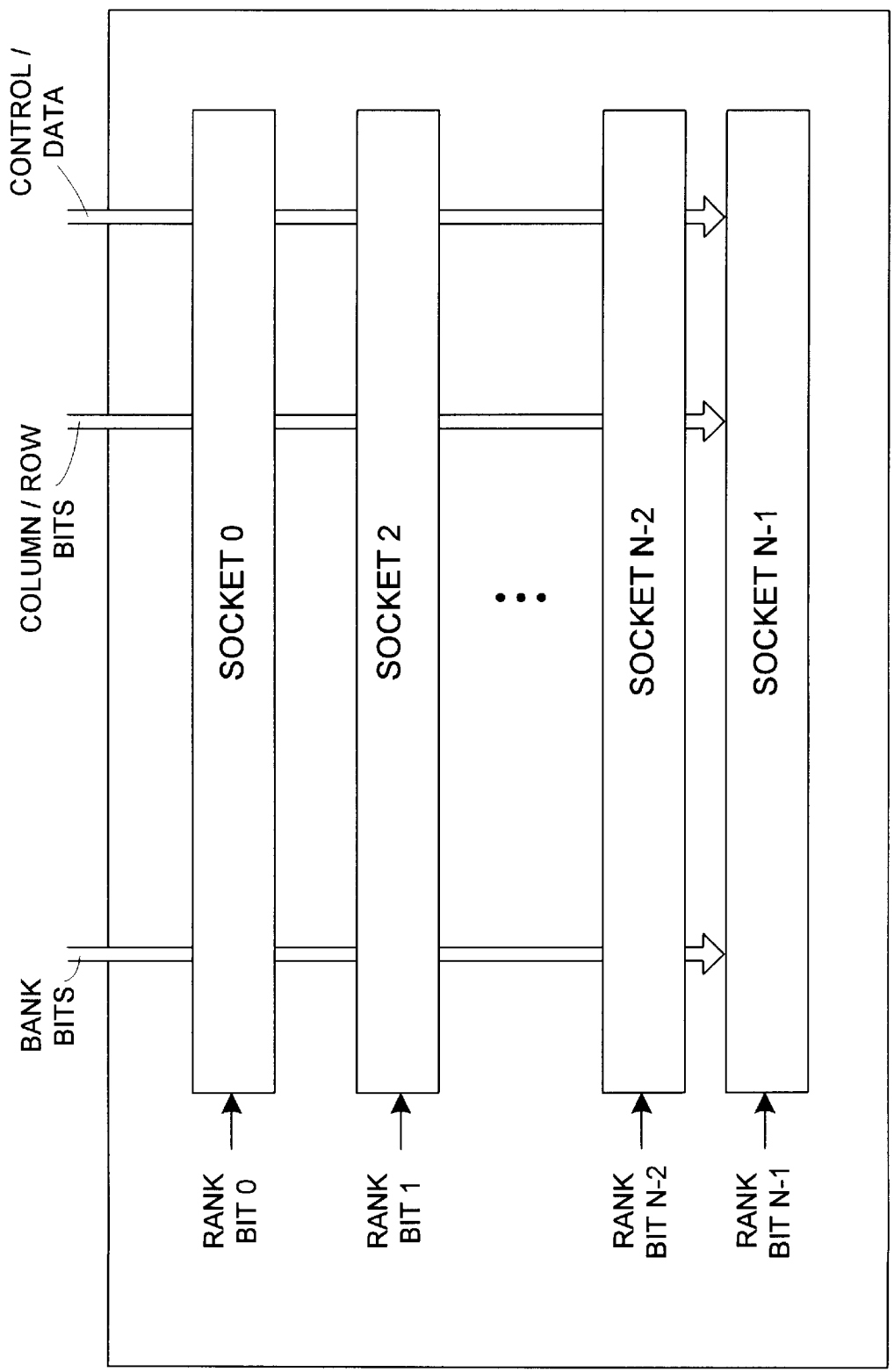
FIG. 3 shows in greater detail the memory sockets of the computer system of FIG. 2.

FIG. 3 shows memory sockets 28 in greater detail. There are N sockets. Each socket receives a separate rank bit, and when that rank bit is asserted, the socket associated with that rank bit is active and must process the memory access request transmitted collectively upon the bank, row, and column bits, and the control and data signals. Note that the row and column bits are multiplexed over the same bus, the bank bits and the control and data signals are provided to the sockets in parallel, and sockets that are not selected by a rank bit ignore inputs and have outputs in a high impedance state.

As indicated above in the section entitled Description of the Related Art, SDRAMs receive bank bits, while asynchronous DRAMs do not. Therefore, bank bits are only provided to sockets containing SDRAMs. As will be seen below, the present invention applies to both asynchronous DRAMs and SDRAMs.

Figure 4:
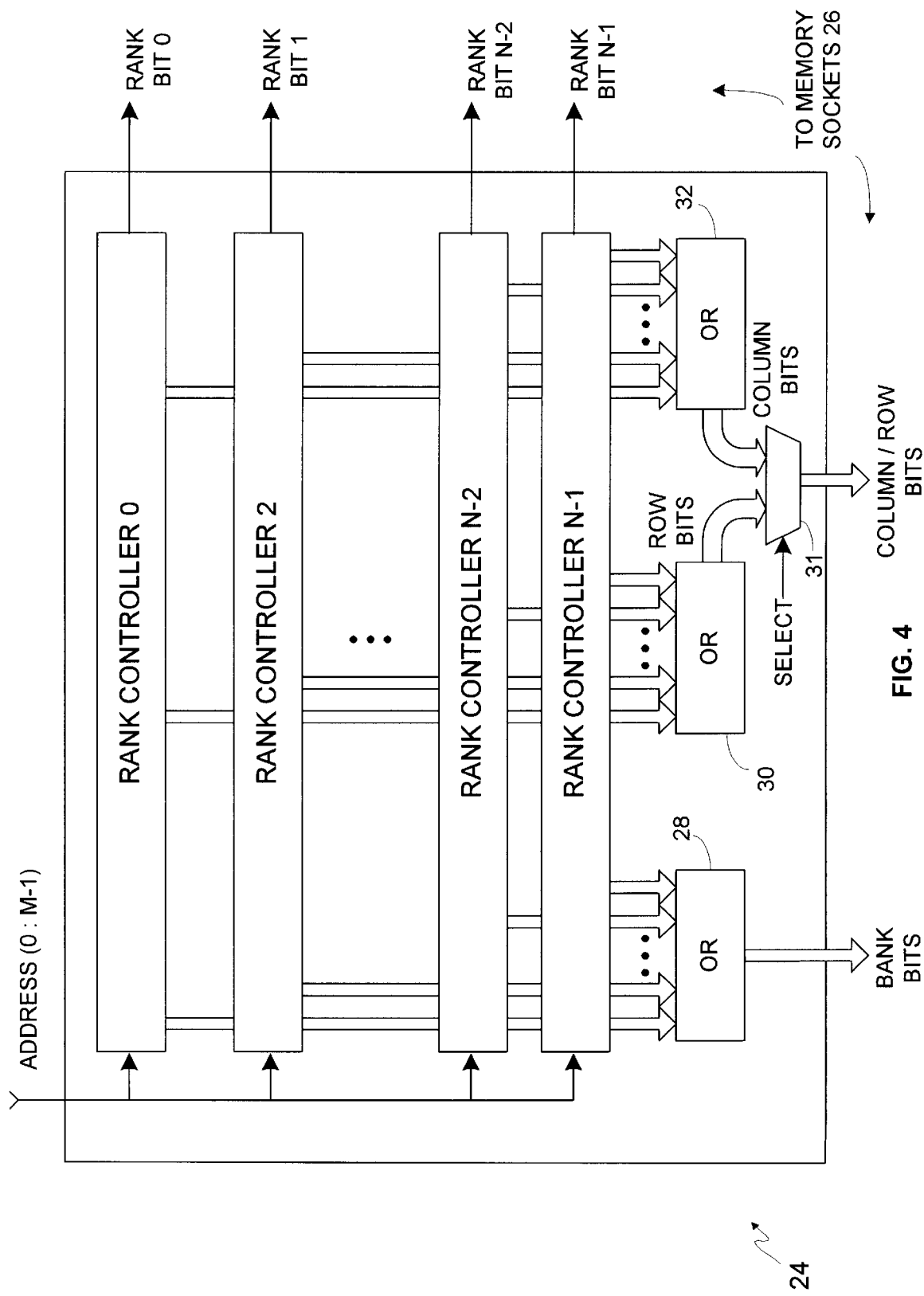
FIG. 4 shows the portion of the memory controller of the computer system of FIG. 2 responsible for routing address bits to rank, bank, row and column bits.

FIG. 4 shows the portion of memory controller 24 that is responsible for routing bits of the address to rank, bank, row and column bits. The address is M bits wide. Controller 24 includes a rank controller for each socket. Accordingly, N sockets are shown in FIG. 3 and controller 24 has N rank controllers. The address is provided to all rank controllers in parallel, and it is the responsibility of each rank controller to determine if it is selected based on the address. If a rank is selected, then that rank controller asserts its rank select bit, and the other rank select bits from the other rank controllers remain deasserted. When a rank controller is selected, that rank controller maps the address bits to the bank, row, and column bits. Block 28 combines together corresponding sets of bank bits from each rank controller to form the bank bits provided to the memory sockets. Assuming that rank controllers that are not selected drive all bank bits low, block 24 can apply a logical OR function to each corresponding set of bank bits to form each bank bit that is provided to the memory sockets. Of course, if rank controllers that are not selected drive all bank bits high, an AND function may be used.

Likewise, block 30 forms the row bits and block 32 forms the column bits, which in turn are provided to multiplexer 31. Multiplexer 31 receives a select signal that determines whether row bits or column bits should be provided to the memory sockets. For example, when accessing a module constructed from asynchronous DRAMs, the row bits would be provided when the RAS signal is asserted and the column bits would be provided when the CAS signal is asserted.

Figure 5:
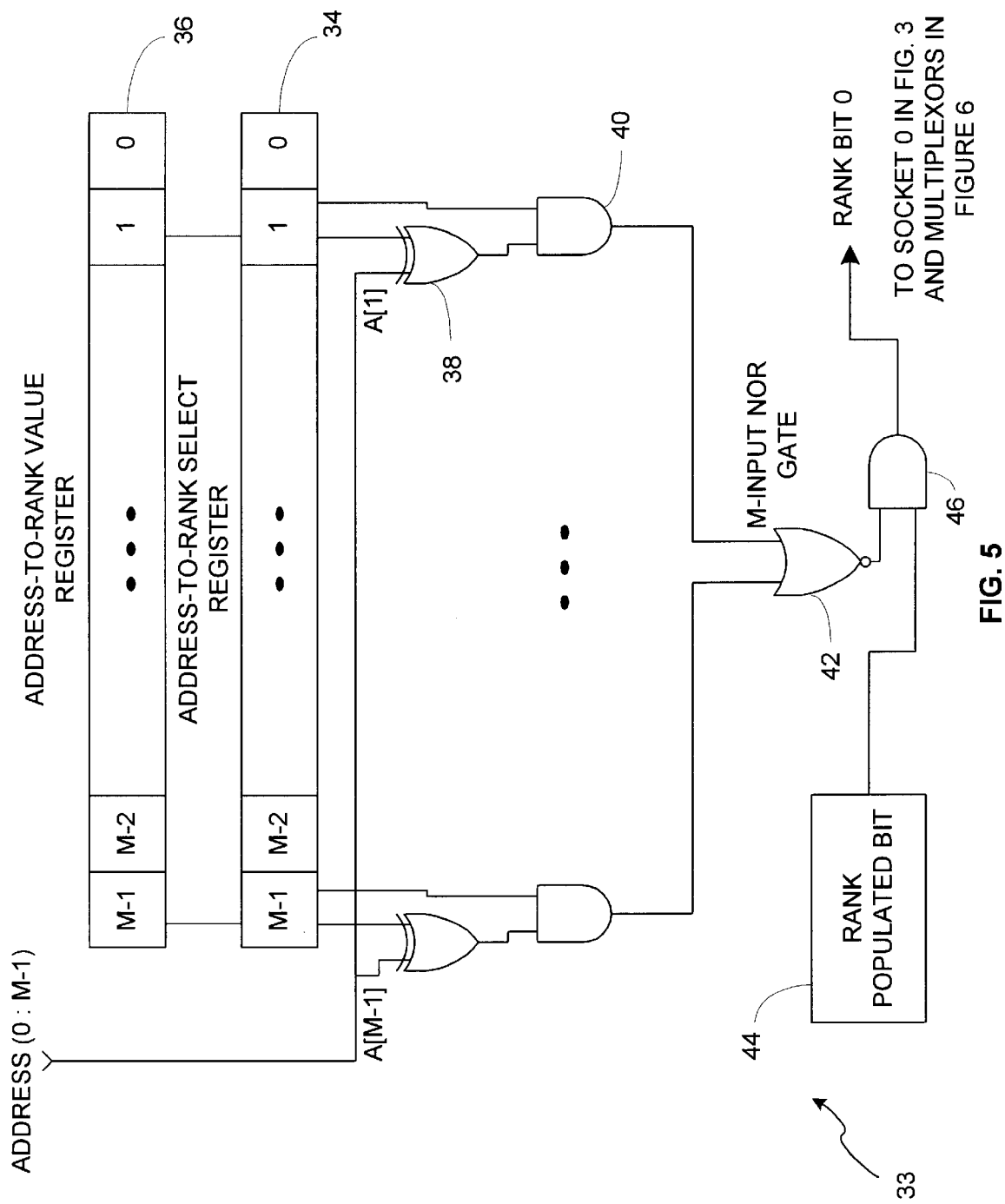
FIG. 5 shows rank select bit generation circuitry.
Figure 6:
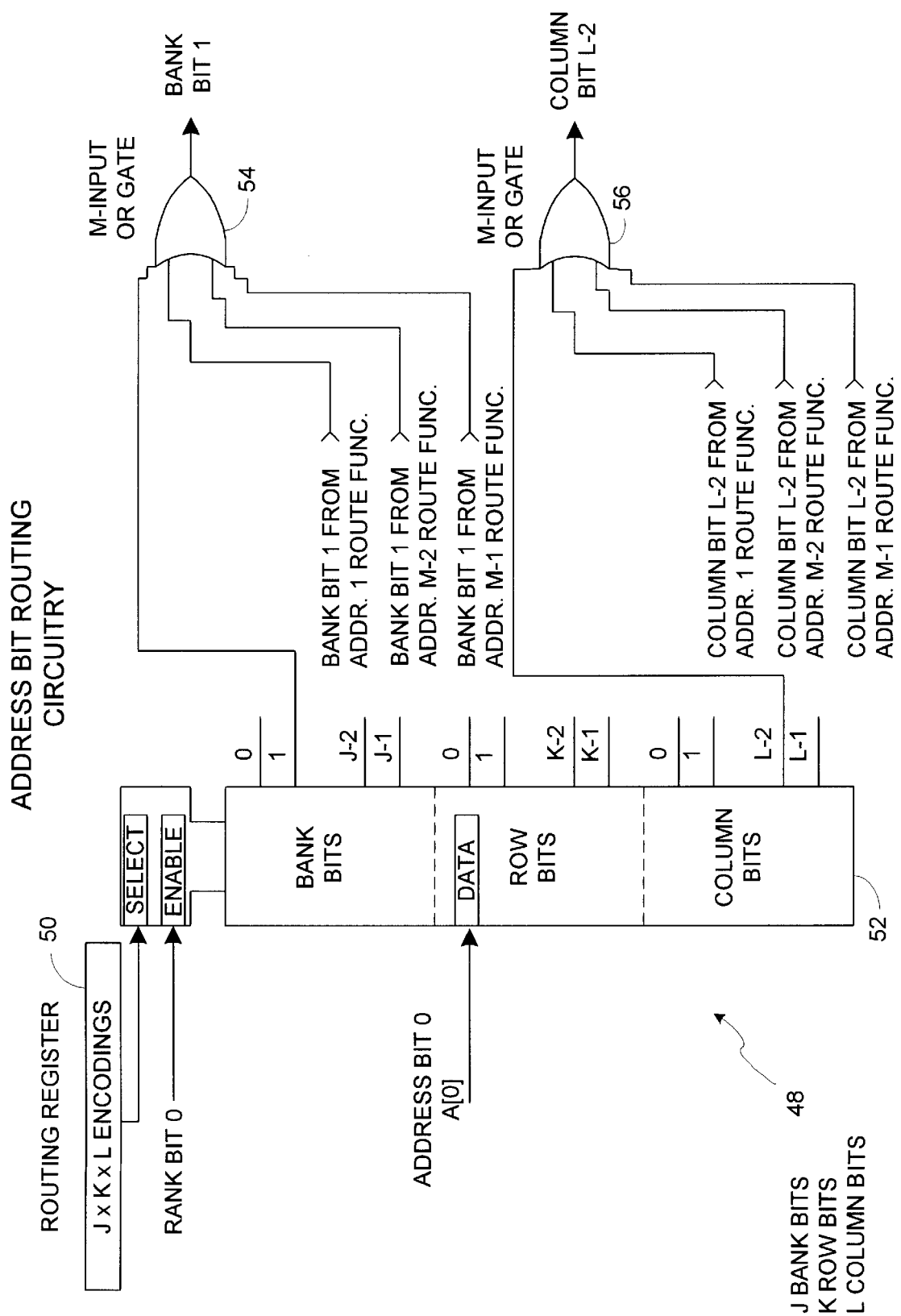
FIG. 6 shows address bit routing circuitry that is required to route an address bit to any bank, row, or column bit.

FIGS. 5 and 6 show an embodiment of a rank controller in accordance with the present invention wherein any combination of address bits can be used to select a rank, and any address bits may be routed to any bank, row, or column bits. FIG. 5 shows rank select bit generation circuitry 33, which is the portion of the embodiment that generates the rank select bit. FIG. 5 shows only the generation of rank bit 0. Therefore, one instance of circuitry 33 is required for each rank controller.

In FIG. 5, rank populated bit 44 is set to "1" if the rank is populated and "0" if the rank is not populated. Address-to-rank select register 34 contains a vector that indicates which address bits are used to generate the rank select bits. If rank 0 is selected based on address bits 1, M-2, and M-1, then the bit positions in register 40 that correspond to these address bits are set to "1". Address-to-rank value register 36 indicates the value of the selected address bits that are required to select the rank. For example, if address bits 1, M-2, and M-1 are selected, and bit 1 must by "0", bit M-2 must be "1" and bit M-1 must be "1", then the corresponding bit positions in register 36 must be set to "0", "1", and "1", respectively. Note that rank populated bit 44 and registers 34 and 36, as well as all the other configuration bits and registers discussed herein, will typically be loaded when computer system 18 is initialized. For simplicity, the data path required to load such registers is not shown. However, those skilled in the art will recognize that such registers may be loaded using a variety of methods common in the art, such as a serial initialization path.

Associated with each address bit is an exclusive-OR (XOR) gate and an AND gate, which are shown only for bit positions 1 and M-1. Consider that address bit position 1 must be a "0" for rank 0 to be selected. Accordingly, bit position 1 of address-to-rank select register 34 must be set to "1" to select address bit 1, and bit position 1 of address-to-rank value register 36 must be set to "0" to indicate the required value. Bit position 1 of register 36 and address bit 1 (A[1] in FIG. 5) are routed to XOR gate 38. If the address bit and the bit from register 36 have the same value, XOR gate 38 produces a "0", otherwise gate 38 produces a "1". AND gate 40 compares the output of gate 38 with bit position 1 of register 34. Since bit position 1 is selected, the output of gate 38 is propagated to M-input NOR gate 42. Of course, if address bit 1 is not used as part of the bank select, bit position 1 of register 34 must be set to "0" and the output of AND gate 40 would be "0". Accordingly, the output of AND gate 40 is a "1" only if the corresponding address bit is selected and the value of the address bit does not match the required value.

If all selected address bits match the required values, all inputs of M-input NOR gate 42 will be "0", and the output of gate 42 will be "1", indicating that the rank is selected. If a single selected address bit does not match its required value, then a "1" will propagate to gate 42, and its output will be "0". Finally, if the rank is not populated and no address bits are selected, the output of gate 42 will be "1". Therefore, rank populated bit 44 is provided to AND gate 46 along with the output of gate 42. If the rank is not populated, bit 44 forces the output of gate 46 to "0". If the bank is populated, bit 44 is "1" and the output of gate 42 is propagated to the output of gate 46. Rank bit 0 is generated at the output of gate 46 and is provided to socket 0 to select a memory module in the socket. Rank bit 0 is also provided to the address bit routing multiplexers, such as multiplexer 52 shown in FIG. 6.

FIG. 6 shows address bit routing circuitry 48, which can route any address bit to any bank, row, or column bit. Circuitry 48 supports J bank bits, K row bits, and L column bits. Routing register 50 contains enough bits to encode each possible routing, and there are at least J+K+L possible routings. It may be desirable to specify addition routings, such as a null routing for address bits that are not used. For example, a computer system capable of accepting memory modules that require up to 3 bank bits, 14 row bits, and 11 column bits will have at least 28 possible routings, and therefore will require at least 5 bits to encode each routing. Register 50 is configured when the computer system is initialized, as described above.

The contents of register 50 are provided to the select input of multiplexer 52. FIG. 6 only shows the instance of register 50 and the instance of multiplexer 52 required to route address bit 0 (A[0] in FIG. 6). Accordingly, each rank controller needs a register 50 and a multiplexer 52 for each address of the M address bits. Rank bit 0, which is generated in FIG. 5, is also provided to the enable input of multiplexer 52. If rank bit 0 is "0" (indicating that the bank is not selected), then all outputs of multiplexer 52 will be "0". Address bit 0 is provided to the data input of multiplexer 52. If rank bit 0 is "1", then address bit 0 is routed to the output of multiplexer 52 indicated by the routing stored in register 50. Note that although multiplexer 52 is shown as a single multiplexer, those skilled in the art will recognize that it may be more practical to implement multiplexer 52 as a multi-level series of multiplexers.

Multiplexer 52 has an output for each possible bank, row, and column bit. Each output of multiplexer 52 is routed to an M-input OR gate, such as M-input OR gate 54 or M-input OR gate 56. Each M-input OR gate receives inputs from the corresponding outputs of each multiplexer associated with each address. For example, OR gate 54 receives the bank bit 1 output of each multiplexer 52 associated with each or the M address bits. Likewise, OR gate 56 receives the column bit L-2 output of each multiplexer 52 associated with each or the M address bits. Each bank, row, and column bit is generated at the output of an M-input OR gate. For example, bank bit 1 is generated at the output of gate 54, and column bit L-2 is generated at the output of gate 56. Each bank, row and column bit from each rank controller is then OR'd with corresponding bits from the other ranks controllers as shown in FIG. 4, thereby forming the bank, row, and column bits routed to the memory sockets shown in FIG. 3.

The embodiment of a rank controller in accordance with the present invention shown in FIGS. 5 and 6 provides maximum flexibility. Any address bit can be routed to any bank, row, or column bit. In addition, any combination of address bits can be used to generate rank select bits. Therefore, this embodiment can support any DRAM configuration and any type of page interleaving scheme. However, this embodiment is quite complex, and therefore requires a substantial amount of logic to implement. In addition, the multiplexers and M-input OR gates required to implement this embodiment may require multiple logic levels, and therefore substantial gate delays may be incurred.

By defining the types of interleaving schemes that are to be supported, along with the maximum number of banks, rows, and columns that are to be supported, embodiments of the present invention can implemented with substantially compacted routing functions. In the first embodiment discussed above, if one wished to support 11 column bits, 14 row bits, and 3 bank bits, 5 bits are required in register 50 and multiplexer 52 must have at least 28 outputs. In the second embodiment discussed below, 11 column bits, 14 row bits, 3 bank bits, and at least 32 rank bits are supported, however the routing function has been reduced to only 3 bits. Therefore, each routing register requires only 3 bits and each multiplexer only requires 8 outputs, resulting in a large decrease in the amount of logic required to implement the routing functions.

Before discussing the second embodiment, it is important to first discuss the types of DRAMs and types of interleaving the second embodiment is designed to support. The second embodiment discussed below will support 8 to 11 column bits, 11 to 14 row bits, 0 to 3 bank bits, and 1 to at least 6 rank bits. Consider a 4-bit wide asynchronous DRAM having 8 column bits and 11 row bits. Such an asynchronous DRAM will have a capacity of 2 megabits. In contrast, consider a 4-bit wide SDRAM having 11 column bits, 14 row bits, and 3 bank bits. Such an SDRAM will have a capacity of 1 gigabit. Accordingly, the second embodiment can support memory modules constructed with DRAM chips sizes between 2 megabits and 1 gigabit, which is an incredible range.

The second embodiment also supports three types of interleaving: DRAM page interleaving, cache effect interleaving, and multi-cache line interleaving. DRAM page interleaving (also known as contiguous page interleaving) is known in the art and causes contiguous (or proximate) DRAM pages to be stored in separate banks. DRAM page interleaving is achieved by routing one or more of the address bits corresponding with the bits immediately above the column boundary to either bank or rank bits. The second embodiment supports allocating up to 8 bank or rank bits to DRAM page interleaving.

Cache effect interleaving is disclosed in a co-pending U.S. patent application entitled "A Main Memory Bank Indexing Scheme That Optimizes Consecutive Page Hits by Linking Main Memory Bank Address Organization to Cache Memory Address Organization" by Tomas G. Rokicki, which is incorporated herein by reference above. Cache effect interleaving greatly increases the probability that cache lines having the same index, but different tags, will be stored in different banks. Cache effect interleaving is achieved by routing one or more of the address bits corresponding with the bits immediately above the cache memory index field to either bank or rank bits. The second embodiment supports allocating up to 5 bank or rank bits to cache effect interleaving.

Finally, multi-cache line interleaving is a new type of interleaving that is part of the present invention. As discussed above in the section entitled Description of The Related Art, cache-line interleaving is in conflict with DRAM page interleaving. On the one hand, it is desirable to have contiguous memory accesses go to same bank to increase the page hit rate, as provided by DRAM page leaving. On the other hand, in a multiprocessor system it is desirable that two or more processors do not thrash the same bank. In the prior art, cache-line interleaving addressed this problem by causing adjacent cache-lines to access different banks. Since the memory accesses of each processor are distributed across multiple banks, no two processors will thrash the same bank. Multi-cache line interleaving causes cache lines contained in the same small contiguous block to be contained in one DRAM page, while contiguous small contiguous blocks are stored on separate DRAM pages. For example, a first block of 8 contiguous cache lines are stored in a first DRAM page, a second block of 8 contiguous cache lines are stored in a second DRAM page, and so on. Multi-cache interleaving balances the desire to have a certain number (such as 8 or 16) of cache line accesses go to the same bank, while ensuring that small contiguous blocks of cache lines go to separate banks. Compared to cache line interleaving, which causes adjacent cache lines to be stored in separate banks, multi-cache line interleaving greatly increases the page hit rate, while maintaining a high probability that the hot spots of a program being accessed by a processor are distributed across multiple banks. Multi-cache line interleaving is achieved by routing one or more of the address bits corresponding with the bits immediately above a small contiguous block of cache lines to either bank or rank bits. The second embodiment supports allocating up to 2 address bits to multi-cache line interleaving.

FIGS. 7–9 illustrate the architecture of the computer system for which the second embodiment has been designed. The architecture provides 64 bit wide address and data busses. However, the physical memory only uses 38 bits of the logical address, which provides up to 256 gigabytes of physical memory. FIG. 7 shows logical address map 58, which illustrates the 64 bit wide address of the computer system. Since the data bus is also 64 bits wide and accesses data in 8 byte units, the first three address bits, A[0]–A[2], are not provided externally by the processor.

FIG. 8 shows cache memory organization 60 and illustrates the cache of the computer system for which the second embodiment has been designed. The cache has a capacity of 4 megabytes, has a 64 byte cache line, and a 14 bit index. The first six bits, A[0]–A[5], represent the cache line. The next 14 bits, A[6]–A[19] form the index and reference one of 16,384 sets, with each set including 4 cache line entries. The next 18 bits, A[20]–A[37] form the tag. A tag entry is associated with each cache line entry in the cache.

As illustrated in FIG. 8, the cache effect interleaving bits are available at the address bits corresponding to the 5 least significant bits of the tag, which are bits A[20]–A[24]. The multi-cache line interleaving bits, A[9]–A[10], are available starting 4 bits above the cache line boundary, which allows interleaving of 16 cache-line blocks between 2 banks or ranks, or interleaving of 8 cache-line blocks between 4 banks or ranks. Note that the positioning of the cache effect interleaving bits and the multi-cache interleaving bits are determined by the cache organization. Specially, the multi-cache line interleaving bits are determined by the cache line size, and the cache-effect interleaving bits are determined by the boundary between the index and the tag.

FIG. 9 shows physical memory organization map 62. The organization of physical memory will, of course, vary based on the number and type of memory modules that are installed in the system. The physical memory is organized to provide a 32 byte wide memory bus, so two memory accesses are required to read or write a cache line.

The first 5 bits, A[0]–A[4], are inherently represented by the width of the memory bus. Note that the width of the bus simply determines the starting boundary of the column bits. With a 32 byte wide memory bus, the first column bit is A[5]. Also note that bits A[3] and A[4], are provided by the processor, but are not used as column bits because the memory bus is 32 bytes wide. However, these bits can be used to determine the order in which 4 64-bit words are packaged into a 32 byte wide memory access. If the memory bus is 16 bytes wide, the first column bit is A[4] and bit A[3] may be used to determine the order in which 2 64-bit words are packaged into a 16 byte wide memory access.

As mentioned above, if the memory bus is 32 bytes wide, the first column bit is bit A[5]. The next 8 to 11 bits are column bits, with the number of column bits determined by the sizes of the DRAM chips present on the memory modules. Note that the number of column, row, and bank bits may vary from rank to rank.

Immediately above the column bits are the bits which correspond to DRAM page interleaving. Up to 8 bits may be allocated to DRAM page interleaving, and the bit range responsible for DRAM page interleaving will vary based on the number of column bits.

Also immediately above the column bits are the row bits. The second embodiment supports 11 to 14 row bits. The bank bits are immediately above the row bits. The second embodiment supports 0 to 3 bank bits. Finally, the rank bits are above the bank bits. Each rank bit corresponds to a memory socket. In a system having memory modules populated by SDRAMs having 11 column bits, 14 row bits, and 3 bank bits, 6 rank bits are available. Of course, if smaller DRAM or SDRAM chips are used, more rank bits are available.

In accordance with the present invention, the routing function associated each address bit may be compacted, while providing the ability to support the DRAM sizes and interleaving strategies discussed above. Several factors allow the routing function to be compacted. First, column bits can be mapped to the lower order address bits, provided that a multiplexer function is used to shift appropriate column bits if 1 or 2 rank or bank bits are allocated to multi-cache line interleaving. Second, within a bank, there is nothing unique about a row bit, and therefore all row bits are interchangeable and no particular row bit provides any performance advantage or disadvantage. Finally, it is not necessary to be able to route every address bit to every bank bit to accommodate all the interleaving strategies described above. While the routing function may be compacted in accordance with these factors, any routing function must be able to support all desired interleaving schemes and all DRAM sizes of interest. In addition, the routing function must allocate logical address bits to rank, bank, row, and column bits such that a single block of contiguous logical addresses are uniquely mapped to physical memory, and there are no unused portions of physical memory.

Figure 10B:
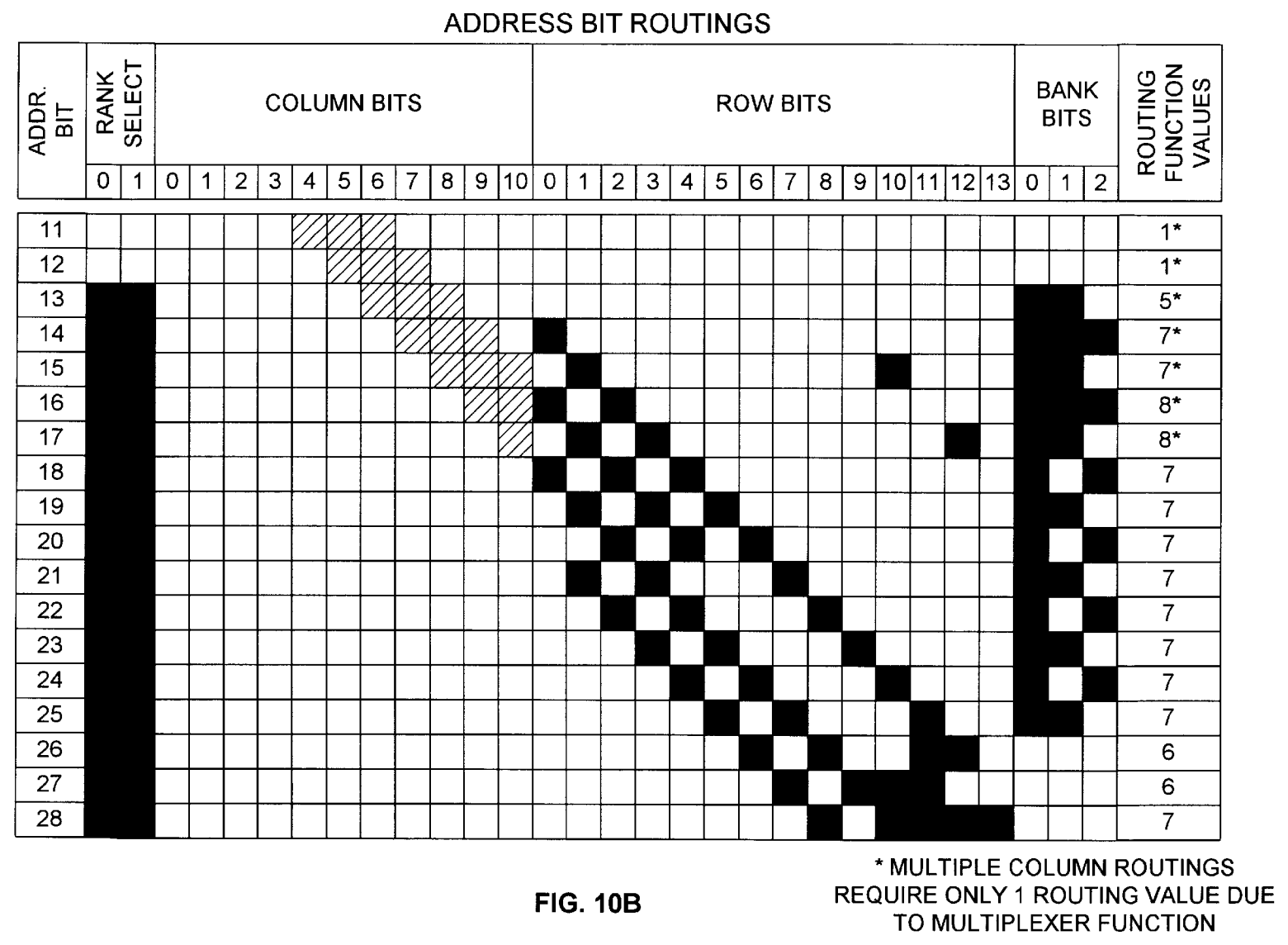

The address bit routings shown in FIGS. 10A–10C support the DRAM sizes and interleaving strategies discussed above, allow a single block of contiguous logical addresses to be uniquely mapped to physical memory such that there are no unused portions of physical memory, and only requiring at most 8 possible routings per address bit. Accordingly, each address bit routing can be stored in 3 bits. Other routings that meet the requirements above are also possible. In addition, those skilled in the art will recognize how to employ the teachings herein to develop comparable compacted routings for various memory configurations.

With reference to FIGS. 10A–10C, address bits A[0]–A[2] are not provided by the CPU, and address bits A[3] and A[4] are used to define the word order. Note that if a 16 byte wide memory data bus is used, only A[3] would be used for word order, and the address mappings would shift down by one bit position.

Address bits A[5], A[6], A[7], and A[8] are mapped to column bits 0, 1, 2, and 3, respectively, so the mapping of these bits is trivial. Address bits A[9] and A[10] may be used as multi-cache line interleaving bits, so these bits can be configured to help generate rank bits, or can be routed to bank bits. Of course, these bits can also be mapped as column bits.

Note that address bits A[9] or A[10] may mapped to rank or bank bits separately or together. To simplify the routing function, a multiplexer is used to shift the appropriate column bits up 1 bit position starting at address A[10], or 1 or 2 bit positions starting at address A[11]. Therefore, even though an address bit, such as bit A[14], can be mapped to 3 different column bits, all 3 column bits are represented by a single encoding. This will be shown in greater detail below with reference to FIG. 13. In FIGS. 10A–10C, column routings that pass through the multiplexer are shown as shaded boxes, while all other routings, including column routings that only go to one column, are shown as black boxes.

As shown in FIG. 4, bank or rank bits do not need to be routed to bits A[11] or A[12]. Therefore, these bits are only routed to column bits. Assuming a memory module uses a DRAM chip having 8 column bits, the first address bit that can be allocated to a bank or rank bit to provide DRAM page interleaving is bit A[13]. Note that the rightmost column in FIGS. 10A–10C shows the number of routing function values, and the number does not exceed 8 for any routing, thereby allowing the routing to be stored in 3 bits.

Figure 11:
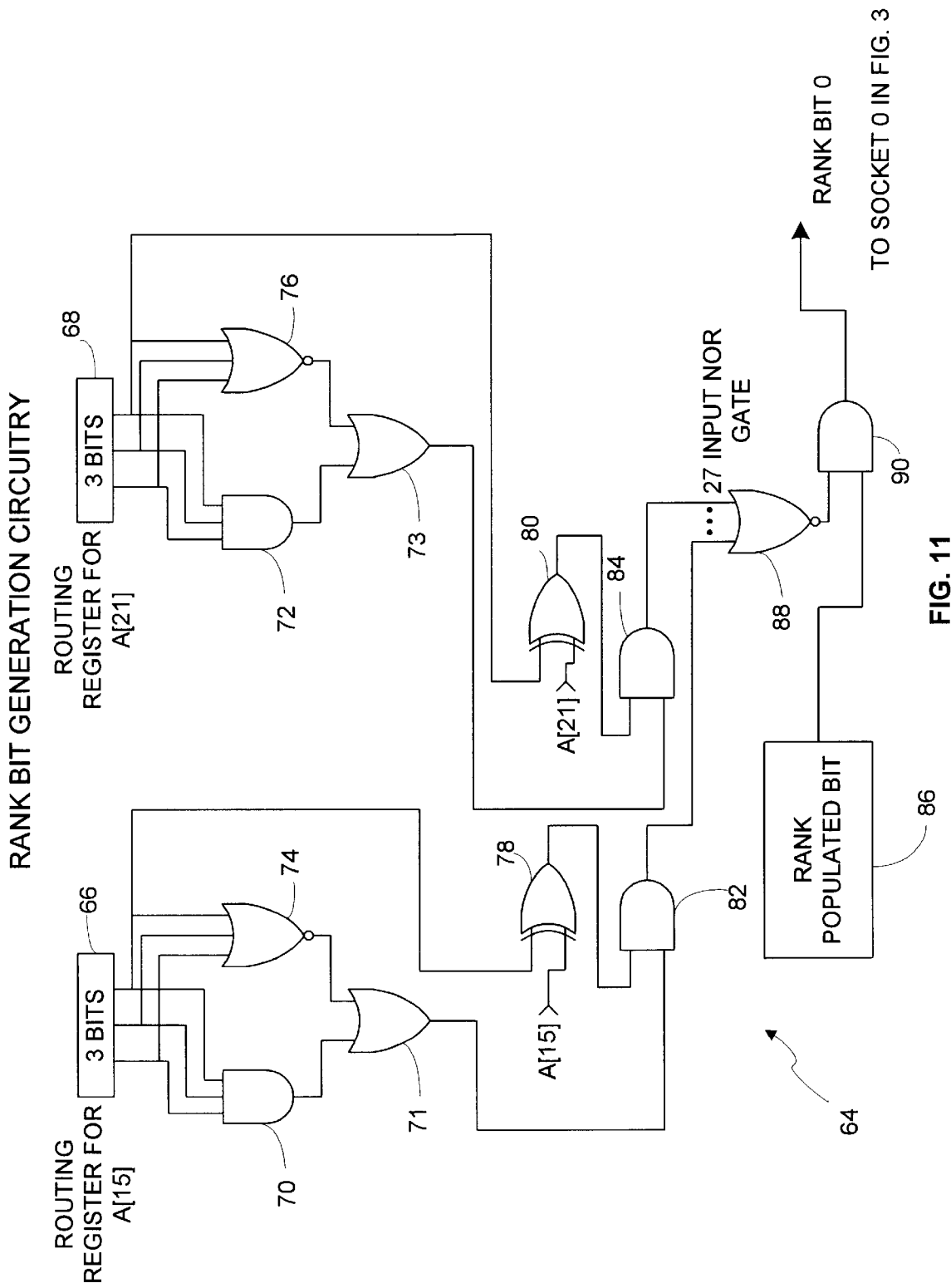
FIG. 11 shows circuitry required to generate rank bits in accordance with the address bit routings shown in FIGS. 10A–10C.

FIG. 11 shows rank bit generation circuitry 64. Rank bit generation circuitry 64 generates rank bit 0, therefore circuitry 64 must be provided for each rank controller. Circuitry 64 must evaluate the rank select routings for address bits A[9], A[10], and A[13]–A[37]. For simplicity, the evaluation of address bits A[15] and A[21] are shown in FIG. 11 as representative of the evaluation of the other bits. The evaluation of the other address bits is substantially the same.

In FIG. 11, routing register 66 holds the address mapping for address bit A[15] and routing register 68 holds the address mapping for bit A[21]. Assume the mapping function of bits A[9], A[10], and A[13]–A[37] uses the encoding "000" to indicate that the address bit is used as a rank select bit and the value of the address bit must be "0" for the rank to be selected, and uses the encoding "111" to indicate that the address bit is used as a rank select bit and the value of the address bit must be "1".

With reference to address bit A[15], if register 66 contains "111", the output of AND gate 70 will be "1". If register 66 contains "000", the output of NOR gate 74 will be 1. If either the output of gate 70 or gate 74 is "1", then the output of OR gate 71 will be "1". Accordingly, the output of gate 71 indicates whether the address bit should be used as a rank select bit. Given the encoding set forth above, any one of the three bits of register 66 may be routed to an input of XOR gate 78. The other input of XOR gate 78 is coupled to address bit A[15]. If bit A[15] does not have the same value as the bit from register 66, the output of XOR gate 78 is "1", and if the values match, the output is "0". AND gate 82 receives the outputs of gates 71 and 78. If bit A[15] is not a rank select bit the output of gate 82 is "0", and if bit A[15] is a rank select bit, the output of gate 82 is "1" only if the value of bit A[15] does not match the value encoded in register 66. The output of gate 82 is provided to 27-input NOR gate 88.

The rank selection bit evaluation of bit A[21] is identical, with gates 72, 73, and 76 detecting whether bit A[21] is a rank select bit, gate 80 comparing the value of bit A[21] with the value encoded in register 68, and gate 84 providing the results of the compare to NOR gate 88 if bit A[21] is a rank select bit. NOR gate 88 receives similar inputs from all the other address bits that can be configured to be rank select bits. If one or more of the address bits configured to be rank select bits had a value different from the value encoded in the routing register of the address bit, then the output of gate 88 will be "0", otherwise the output of gate 88 will be "1".

Rank populated bit 86 is set to "1" if the associated socket contains a memory module, and is set to "0" if the socket is not populated. AND gate 90 receives bit 86 and the output of gate 88. If the socket is not populated, the rank bit is "0", and if the socket is populated, the rank bit is "1" if the rank is selected.

Figure 12:
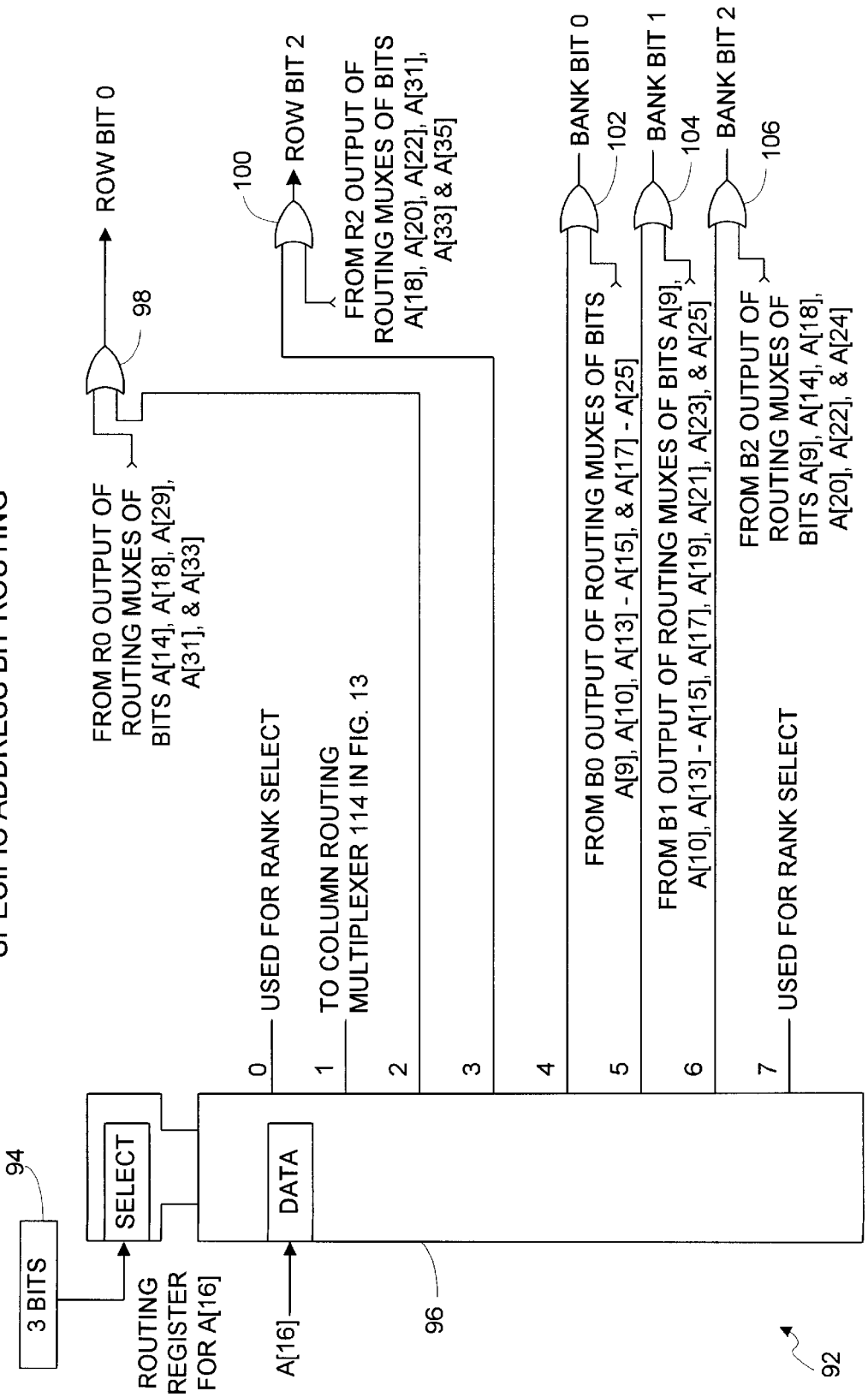
FIG. 12 shows the circuitry required to implement one of the address bit routings shown in FIGS. 10A–10C.

FIG. 12 shows circuit 92, which implements the routing function of address bit A[16]. Bit A[16] good choice to illustrate the compacted routing function of the present invention because it can be configured to be either a rank select bit, 1 of 2 column bits, 1 of 2 row bits, or 1 of 3 bank bits. In addition, Bit A[16] uses all 8 encodings provided by the 3 bit compacted routing function.

Assume that the routing function of bit A[16] is encoded as follows:

| Encoding Value | Encoding Bits | Function |
| --- | --- | --- |
| 0 | 000 | Rank Select Bit = "0" |
| 1 | 001 | Column Bit 9 or 10 |
| 2 | 010 | Row Bit 0 |
| 3 | 011 | Row Bit 2 |
| 4 | 100 | Bank Bit 0 |
| 5 | 101 | Bank Bit 1 |
| 6 | 110 | Bank Bit 2 |
| 7 | 111 | Rank Select Bit = "1" |

Circuit 92 includes routing register 94 for address bit A[16], multiplexer 96, and OR gates 98, 100, 102, 104, and 106. Register 94 holds the 3 bit quantity that indicates the routing function for address bit A[16]. The possible encodings are shown above. The 3 bit quantity is provided to the select input of multiplexer 96. Based on the 3 bit quantity, the address bit is routed to 1 of 8 outputs. As discussed above with reference to FIG. 11, the encodings "000" and "111" are reserved for rank select bits, so outputs 0 and 7 are not used.

Output 1 is provided to column routing multiplexer 114 in FIG. 13, which will be described in greater detail below. The other outputs are routed in accordance with the encodings above. For example, output 2 corresponds to the encoding for row bit 0, and is routed to OR gate 98. Similar outputs from other routing multiplexers that have outputs encoded for row bit 0 are also provided to gate 98. As shown in FIGS. 10B and 10C, address bits A[14], A[18], A[29], A[31], and A[33] can all be mapped to row bit 0, and therefore all have multiplexer output lines coupled to gate 98. Similarly, output 3 is routed to OR gate 100 to help generate row bit 2, output 4 is routed to OR gate 102 to help generate bank bit 0, output 5 is routed to OR gate 104 to help generate bank bit 1, and output 6 is routed to OR gate 106 to help generate bank bit 2. Note that the terms R0, R2, B0, B1, and B2 are used as abbreviations for row bits 0 and 2, and bank bits 0, 1, and 2, respectively. Also note that the row and bank bits generated in FIG. 12 are generated for each rank controller, and corresponding bits from individual rank controllers have to be combined as shown in FIG. 4.

As mentioned above, some of the column bits may be shifted by a multiplexer if address bits A[9] and/or A[10] are mapped to rank or bank bits. Assume the routing function for bit A[9] is encoded as follows:

| Encoding Value | Encoding Bits | Function |
|---|---|---|
| 0 | 000 | Rank Select Bit = "0" |
| 1 | 001 | Column Bit 4 |
| 2 | 010 | Bank Bit 0 |
| 3 | 011 | Bank Bit 1 |
| 4 | 100 | Bank Bit 2 |
| 5 | 101 | Unused |
| 6 | 110 | Unused |
| 7 | 111 | Rank Select Bit = "1" |

Further assume that the routing function for bit A[10] is encoded as follows:

| Encoding Value | Encoding Bits | Function |
|---|---|---|
| 0 | 000 | Rank Select Bit = "0" |
| 1 | 001 | Column Bit 4 or 5 |
| 2 | 010 | Bank Bit 0 |
| 3 | 011 | Bank Bit 1 |
| 4 | 100 | Unused |
| 5 | 101 | Unused |
| 6 | 110 | Unused |
| 7 | 111 | Rank Select Bit = "1" |

Note that each bit has the same encoding for a column bit, and that each bit can only be a column bit, a bank bit, or used to generate the rank bit.

Figure 13:
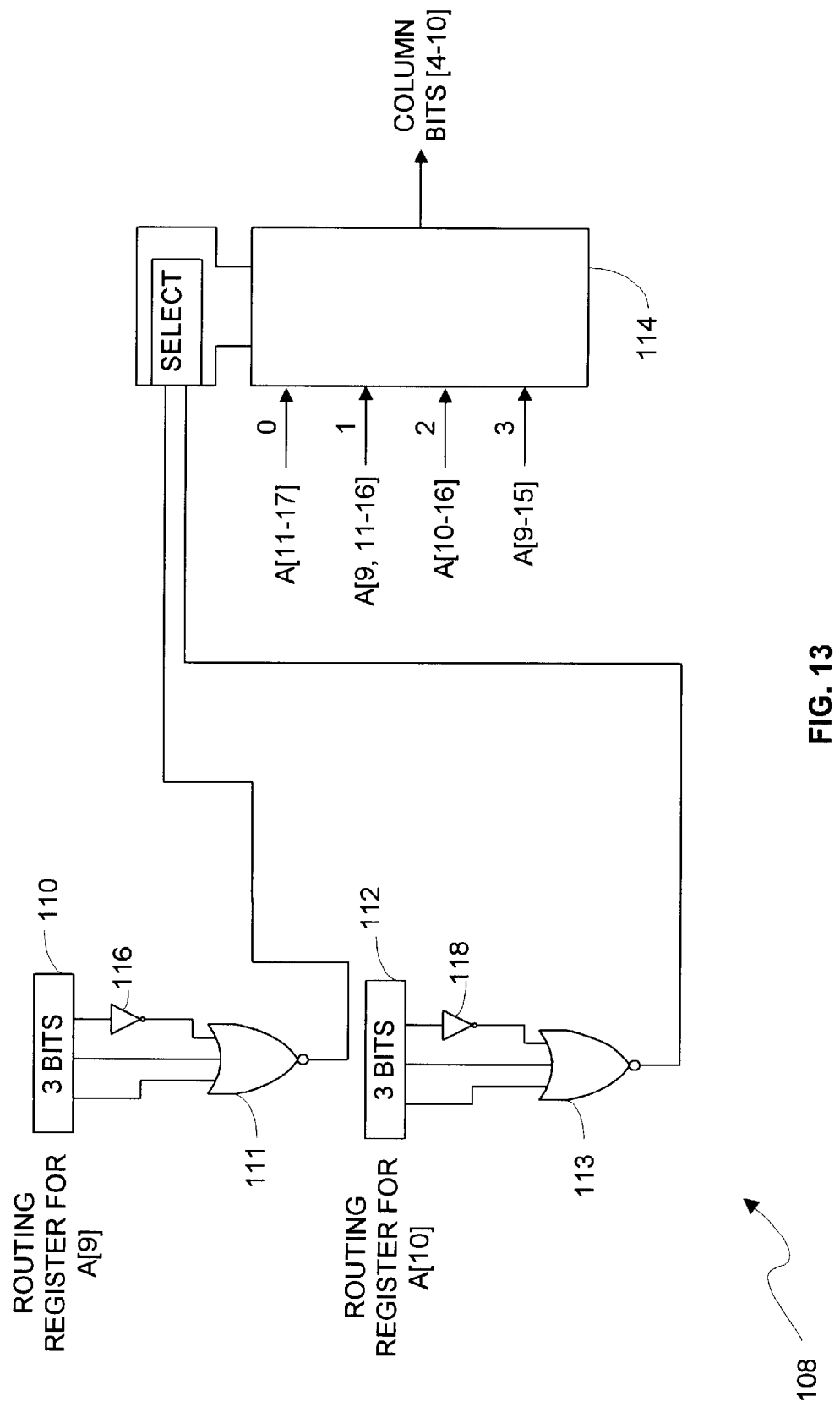
FIG. 13 shows circuitry required to route column bits in accordance with the address bit routings shown in FIGS. 10A–10C.

FIG. 13 shows circuit 108, which routes column bits based on whether bits A[9] and/or A[10] are column bits. Routing register 110 holds the encoding for address bit A[9] and routing register 112 holds the encoding for encoding for bit A[10]. Inverter 116 and NOR gate 111 test for a column mapping for bit A[9], and inverter 118 and NOR gate 113 test for a column mapping for bit A[10]. Assume that register 110 contains the encoding for a column bit, which is "001". The output of gate 111 will be "1". If bit A[9] is mapped to a bank bit or is used to generate a rank bit, the output of gate 111 will be "0". The presence of a column routing for bit A[10] is detected at the output of gate 113 in the same manner.

The outputs of gates 111 and 113 are routed to the select input of multiplexer 114. The output of gate 111 is the least significant bit and the output of gate 113 is the most significant bit. Column bits 4 to 10 are provided at the output of multiplexer 114. Based on the select bits, 1 of 4 possible mappings are provided to the column bits. Note that column bits 0 to 3 are directly mapped to address bits A[5]–A[8], respectively.

Assume that both bits A[9] and A[10] are mapped to column bits. Both select inputs of multiplexer 114 will be "1" and input 3 of multiplexer 114 will be routed to the column bits. Accordingly, address bits A[9] through A[15] will be sequentially mapped to column bits 4 through 10.

Now assume that address bit A[10] is routed to a column bit, but address bit A[9] is mapped to a bank bit or is used to help generate a rank bit. This routing provides multi-cache line interleaving between two pages of cache blocks containing 8 contiguous cache lines each. The input 2 of multiplexer 114 is selected, which causes all column mappings to be shifted up one address bit position from the mapping provided at input 3. Therefore, bit A[9] is available to be used as a bank or rank bit.

If address bit A[9] is routed to a column bit, but address bit A[10] is mapped to a bank bit or is used to help generate a rank bit, multi-cache line interleaving is provided between two pages of cache blocks containing 16 contiguous cache lines each. Input 1 of multiplexer 114 is selected, which maps address bit A[9] to column bit 4, and address bits A[11] through A[16] to column bits 5 through 10, respectively.

Finally, if both bits A[9] and A[10] are mapped to a bank bit or are used to help generate a rank bit, multi-cache line interleaving is provided between 4 pages of cache blocks containing 8 contiguous cache lines each. Input 0 of multiplexer 114 is selected. Since bits A[9] and A[10] are both unavailable for routing to a column, all column mappings are shifted up two bit positions. Accordingly, address bits A[11] through A[17] are sequentially mapped to column bits 4 through 10.

Note that in FIG. 12, output 1 of multiplexer 96 is routed to multiplexer 114. Output 1 of multiplexer 96 is not coupled to input 3 of multiplexer 114. If input 1 or 2 of multiplexer 114 is selected, output 1 of multiplexer 96 is coupled to column bit 10. Finally, if input 0 of multiplexer 114 is selected, output 1 of multiplexer 96 is coupled to column bit 9. The connection of other multiplexer outputs follows logically from the bit mappings shown in FIGS. 10A–10C and the bit mappings shown at the inputs and outputs of multiplexer 114.

The present invention provides numerous advantages over prior art address bit routing schemes. For example, the present invention allows great flexibility in accommodating different types and configurations of memory modules. Each rank can be configured independently, thereby allowing a wide variety of memory module configurations to concurrently populate a computer system in accordance with the present invention.

In addition, the present invention is capable of providing cache effect interleaving, DRAM page interleaving, and multi-cache line interleaving for any type of memory module capable of populating a socket in a computer system in accordance with the present invention. Even though memory sockets may contain memory modules having different numbers of column and row bits, the present invention allows each rank to be optimally configured to support a variety of interleaving schemes.

In one embodiment, the routing scheme provided by the present invention is very compact. Not only does this lead to a decrease in the amount of logic required to route address bits, it also increases speed by computing each address bit route determination in parallel, thereby eliminating logic levels.

Although the present invention has been described with reference to preferred embodiments, workers skilled in the art will recognize that changes may be made in form and detail without departing from the spirit and scope of the invention.

What is claimed is:

1. A computer system that implements multi-cache line interleaving comprising:

a processor that generates an m bit address to facilitate memory accesses, wherein address bits of the m bit address are arranged in ascending order from a least significant 0 address bit to a most significant m−1 address bit;

a main memory unit that is $2^h$ bytes wide and is addressed via bank bits, row bits, and l column bits;

a cache memory coupled to the processor, the cache memory holding a subset of contents of the main memory unit, wherein the cache memory is organized into a series of cache lines, and each cache line is $2^q$ bytes wide; and memory controller coupled between the main memory unit and the cache memory, wherein the memory controller generates from the m bit address the bank, row, and column bits required by the main memory unit, with each address bit more significant than the h−1 address bit and less significant than the q+1 address bit mapped to a column bit, one or more address bits more significant than the q address bit and less significant than the h+l−1 address bit used to generate a first set of one or more bank bits, one or more address bits more significant than the q address bit and less significant than the h+1 address bit mapped to column bits, and one or more address bits mapped to row bits.

2. The computer system of claim 1 wherein a portion of the bank bits are used as rank bits.

3. The computer system of claim 1 wherein the memory controller generates a second set of one or more bank bits from address bits immediately more significant than the h+l−1 address bit, thereby implementing page interleaving.

4. The computer system of claim 3 wherein a portion of the bank bits are used as rank bits.

5. The computer system of claim 3 wherein the cache lines of the cache memory are organized into sets of cache lines that are addressed by an index portion of the m bit address, and a tag portion of the m bit address is associated with each cache line, and the memory controller generates a third set of one or more bank bits from one or more bits from the tag portion of the m bit address, thereby implementing cache effect interleaving.

6. The computer system of claim 5 wherein a portion of the bank bits are used as rank bits.

7. The computer system of claim 5 wherein the one or more bits from the tag portion of the m bit address that are used to generate the third set of one or more bank bits are the least significant bits of the tag portion.

8. The computer system of claim 1 wherein the cache lines of the cache memory are organized into sets of cache lines that are addressed by an index portion of the m bit address, and a tag portion of the m bit address is associated with each cache line, and the memory controller generates a second set of one or more bank bits from one or more bits of the tag portion of the m bit address, thereby implementing cache effect interleaving.

9. The computer system of claim 8 wherein a portion of the bank bits are used as rank bits.

10. The computer system of claim 8 wherein the one or more bits from the tag portion of the m bit address that are used to generate a third set of one or more bank bits are the least significant bits of the tag portion.

11. The computer system of claim 1 wherein the computer system employs a big endian address format.

12. The computer system of claim 1 wherein the computer system employs a little endian address format.

13. A method of implementing multi-cache interleaving by converting an m bit address generated by a processor in a computer system to bank bits, row bits, and l column bits used to access a main memory system of the computer system that is $2^h$ bytes wide, wherein address bits of the m bit address are arranged in ascending order from a least significant 0 address bit to a most significant m−1 address bit, the computer system also includes a cache memory that holds a subset of contents of the main memory, with the cache memory organized into a series of cache lines and each cache line is $2^q$ bytes wide, the method comprising:

generating a first set of one or more bank bits based on one or more address bits more significant than the q address bit and less significant than the h+l−1 address bit;

mapping a column bit to each address bit more significant than the h−1 address bit and less significant than the q+1 address bit;

mapping one or more column bits to address bits more significant than the q address bit and less significant that h+1 address bit; and mapping row bits to address bits.

14. The method of claim 13 wherein a portion of the bank bits are used as rank bits.

15. The method of claim 13 and further comprising:

generating a second set of one or more bank bits from address bits immediately more significant than the h+l−1 address bit, thereby implementing page interleaving.

16. The method of claim 15 wherein a portion of the bank bits are used as rank bits.

17. The method of claim 15 wherein the cache lines of the cache memory are organized into sets of cache lines that are addressed by an index portion of the m bit address, and a tag portion of the m bit address is associated with each cache line, the method further comprising:

generating a third set of one or more bank bits from one or more bits of the tag portion of the m bit address, thereby implementing cache effect interleaving.

18. The method of claim 17 wherein a portion of the bank bits are used as rank bits.

19. The method of claim 15 wherein the one or more bits from the tag portion of the m bit address that are used to generate the third set of one or more bank bits are the least significant bits of the tag portion.

20. The method of claim 13 wherein the cache lines of the cache memory are organized into sets of cache lines that are addressed by an index portion of the m bit address, and a tag portion of the m bit address is associated with each cache line, the method further comprising:

generating a third set of one or more bank bits from one or more bits of the tag portion of the m bit address, thereby implementing cache effect interleaving.

21. The method of claim 20 wherein a portion of the bank bits are used as rank bits.

22. The method of claim 20 wherein the one or more bits from the tag portion of the m bit address that are used to generate the third set of one or more bank bits are the least significant bits of the tag portion.

23. A method of mapping n address bits provided by a processor to rank, bank, row, and column bits required to access a main memory unit, the method comprising:

accessing a routing register for each of the n address bits to retrieve a routing encoding;

routing each address bit to a bank bit, row bit, or column bit based on the routing encoding accessing an address-to-rank select register for each rank bit to be generated, wherein the address-to-rank select register identifies address bits to be considered when generating a rank bit associated with the address-to-rank select register;

accessing an address-to-rank select register for each rank bit to be generated, wherein the address-to-rank select register identifies address bits to be considered when generating a rank bit associated with the address-to-rank select register;

accessing an address-to-rank value register for each rank bit to be generated, wherein the address-to-rank value register indicates values required to be found at address bits that are selected to be considered when generating a rank bit associated with the address-to-rank select register and the address-to-rank value register; and asserting each rank bit if the values of the address bits selected by the address-to-rank select register associated with the rank bit match the corresponding values stored in the address-to-rank value register associated with the rank bit.

24. A computer system comprising:

a processor that generates an m bit address to facilitate memory accesses, wherein address bits of the m bit address are arranged in ascending order from a least significant 0 address bit to a most significant m−1 address bit;

a main memory unit that is $2^h$ bytes wide and comprises memory sockets that supports memory modules that are addressed via j bank bits, k row bits, and at least l and no more than p column bits, wherein p is greater than l+1; and a memory controller coupled between the main memory unit and the processor, wherein the memory controller includes a reduced routing function that routes an address bit more significant than the l+h bit and less significant than the p+h bit to one member of a reduced set comprising at least one and less than j bank bits, at least one and less than j bank bits, and at least one and less than p column bits.

25. A computer system comprising:

a processor that generates an m bit address to facilitate memory accesses, wherein address bits of the m bit address are arranged in ascending order from a least significant 0 address bit to a most significant m−1 address bit;

a cache memory coupled to the processor, the cache memory holding a subset of contents of the main memory unit, wherein the cache memory is organized into a sets of cache lines that are addressed by an index portion of the address, and a tag portion of the address is associated with each cache line;

a main memory unit that is $2^h$ bates wide and is addressed via j bank bits, k row bits, and column bits; and a memory controller coupled between the main memory unit and the cache memory, wherein the memory controller includes a reduced routing function that routes an address bit from the tag portion of the address to one member of a reduced set comprising at least one and less than j bank bits and at least one and less than j bank bits.

26. A computer system comprising:

a processor that generates an address at least 32 bits wide to facilitate memory accesses;

a cache memory coupled to the processor, the cache memory holding a subset of contents of the main memory unit, wherein the cache memory is organized into a sets of cache lines that are addressed by an index portion of the address, and a tag portion of the address is associated with each cache line;

a main memory unit that is $2^h$ bytes wide and comprises memory sockets that support memory modules that are addressed via up to 3 bank bits, between k and k+3 row bits, inclusive, and between l and l+3 column bits, inclusive; and a memory controller coupled between the main memory unit and the cache memory, wherein the memory controller includes a plurality of reduced routing functions that route a corresponding plurality of address bits such that no encoding for a reduced routing function requires more than 3 bits, and the memory controller implements at least two interleaving strategies from the set of: multi-cache interleaving, cache effect interleaving, and page interleaving.

27. The computer system of claim 26 wherein each reduced routing function of the plurality of reduced routing functions indicates whether an address bit associated with the reduced routing function participates in the generation of a rank bit, and indicates a value the address bit associated with the reduced routing function must assume for the rank bit to be asserted.

* * * * *